United States Patent [19]

Streuber

[11] Patent Number: 4,479,909
[45] Date of Patent: Oct. 30, 1984

[54] DISTRIBUTOR STAGE FOR LIQUID-CONTACTING COLUMNS

[75] Inventor: Hans P. Streuber, Hilden, Fed. Rep. of Germany

[73] Assignee: Julius Montz GmbH, Hilden, Fed. Rep. of Germany

[21] Appl. No.: 435,495

[22] Filed: Oct. 20, 1982

[30] Foreign Application Priority Data

Oct. 22, 1981 [DE] Fed. Rep. of Germany ....... 3141930

[51] Int. Cl.³ .............................................. B01F 3/04
[52] U.S. Cl. ............................ 261/97; 261/DIG. 44; 239/193
[58] Field of Search ......................... 261/97, DIG. 44; 239/193

[56] References Cited

U.S. PATENT DOCUMENTS

| 1,987,881 | 1/1935 | Seggern et al. | 261/DIG. 44 |
| 2,609,888 | 9/1952 | Beringer | 261/97 |
| 3,146,609 | 9/1964 | Engalitcheff, Jr. | 261/97 |
| 3,488,924 | 1/1970 | Reeve | 261/118 |
| 3,804,386 | 4/1974 | Arnold et al. | 261/118 |
| 3,937,769 | 2/1976 | Strigle, Jr. et al. | 261/97 |
| 4,264,538 | 4/1981 | Moore et al. | 261/DIG. 44 |
| 4,267,978 | 5/1981 | Manteufel | 261/97 |
| 4,390,481 | 6/1983 | Ernst et al. | 261/DIG. 11 |

FOREIGN PATENT DOCUMENTS

| 2752391 | 5/1979 | Fed. Rep. of Germany ... 261/DIG. 44 |
| 668293 | 12/1952 | United Kingdom ....... 261/DIG. 44 |
| 573176 | 10/1977 | U.S.S.R. ............................... 261/97 |

Primary Examiner—Tim Miles
Attorney, Agent, or Firm—Karl F. Ross; Herbert Dubno

[57] ABSTRACT

A distributor stage for an exchange column utilizes a plurality of tubes having openings spaced apart on upper sides thereof and leading to respective troughs which are formed on the upper sides of the tubes. The liquid is spread from the troughs by capillary channels which carry the liquid through slits in the walls of the troughs onto tongues spreading below the tubes.

11 Claims, 7 Drawing Figures

Fig.4
Fig.5
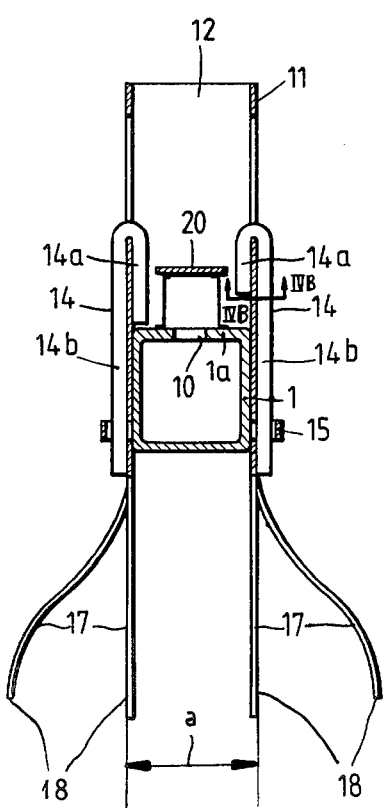
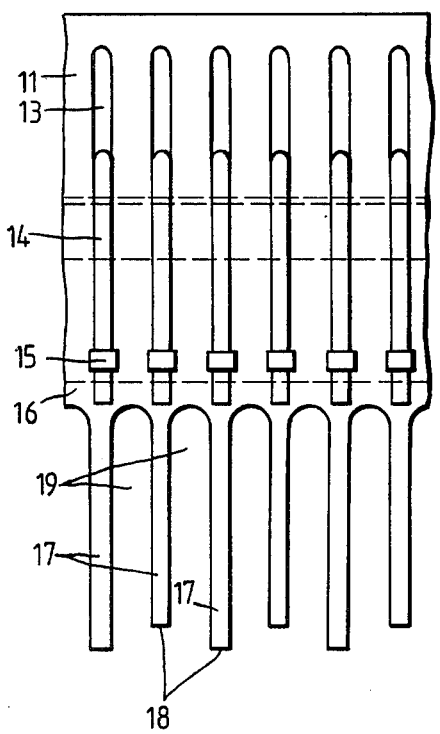
Fig.4A
Fig.4B
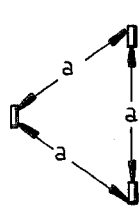
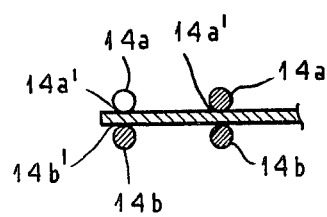

1

DISTRIBUTOR STAGE FOR LIQUID-CONTACTING COLUMNS

FIELD OF THE INVENTION

My present invention relates to a distributor stage for liquid-contacting columns and, more particularly, to a so-called "plate" for a material or thermal exchange column in which a liquid is distributed by a column stage and passes downwardly generally in finely divided form and in counterflow to a rising fluid.

BACKGROUND OF THE INVENTION

Liquid-contacting columns are provided for a wide variety of purposes and generally comprise so-called distributor plates which are horizontal, vertically spaced elements upon which the liquid is distributed in finely divided form, e.g. a thin film, droplets or streamlets, such that the plate is permeable to a rising fluid flow.

For example, such plates or stages may be used in liquid-gas contacting columns in which the liquid descends in counterflow to a rising gas for thermal exchange with the gas and/or material exchange therewith. In the latter case, for example, the liquid can be a solvent capable of extracting a component from the gas. In the former case, the liquid may be heated by the gas or the gas may be brought into thermal equilibrium with the liquid for other reasons.

Such columns have also been used for contacting two immiscible liquids with one another, e.g. for extraction or thermal exchange purposes, the more dense liquid descending from plate to plate while the less dense liquid rises through the column.

Since the efficiency of the exchange of the column is dependent upon the number of stages or levels, it is desirable to provide a column having a multiplicity of stages and levels and heretofore there has been a tendency to provide these levels as discrete plates formed with bubble caps or the like to distribute the liquid in thin-film or thin-layer, streamlet or droplet patterns to achieve a maximum surface area of exchange for a given volume on the particular plate.

There are, however, distributor stages for exchange columns in use in which each stage comprises a multiplicity of mutually parallel horizontal tubes or channels which are fed from manifold tubes or channels with the liquid and which have, along their respective lengths, spaced apart openings for distributing the liquid.

An important advantage of a tube distributor stage of this type is that it can operate in a closed piping system utilizing a liquid under an elevated pressure and to which an elevated flow velocity can be provided by this higher pressure.

Such stages can thus be operated under forced-flow principles with comparatively large throughputs for proportionately small flow cross sections, thereby providing a greater free cross section (in the column) for the rising phase, e.g. a gas or vapor phase.

This means that the column can operate with a reduced pressure drop for a given number of stages and a larger actual cross section for the vapor phase.

A tube distributor of the aforedescribed type has, however, the disadvantage that because of the relatively high discharge velocities of the liquid from the various holes or openings, only a limited number of comparatively small openings can be provided. When the distributor stage is of the trough-type, the number of run off locations can be made substantially larger, thereby increasing the uniformity of distribution of the liquid. Hence trough-type distributors have certain advantages over the tube-type distributors.

Trough-type distributors, however, also have certain disadvantages. For example, in practice it is found that conventional distributing troughs of such arrangements must be fed highly uniformly with the liquid so that the liquid is always at a predetermined depth which is uniform for all of the troughs.

This is an extremely costly and complicated system which has not found extensive application in practice.

It is also known to provide a distributor stage for an exchange column which comprises parallel horizontal channels in each of which a horizontal tube is provided. A lower portion of each tube is formed with a plurality of openings which communicate with the interior of the channel and these tubes are supplied centrally of their respective lengths with liquid from a common manifold.

Even with this system, varying levels of liquid in the channels create problems which cannot be satisfactorily dealt with economically with the earlier arrangement.

OBJECTS OF THE INVENTION

It is, therefore, the principal object of the present invention to provide a stage for an exchange column whereby the disadvantages enumerated above are eliminated.

Another object of this invention is to provide a distributor stage for the purposes described which eliminates the disadvantages of the earlier tube and channel distributors but which, at low cost and with high efficiency, permits advantages of these systems to be retained and a uniform distribution of liquid to be provided both when small and large fluid flow rates are provided.

Still another object of the invention is to increase the range of effectiveness of an exchange column of the type described while providing a reasonably free cross section for the flow of a vapor phase through the column in counterflow to the descending liquid phase.

SUMMARY OF THE INVENTION

These objects and others which will become apparent hereinafter are attained, in accordance with the present invention, in a distributing stage for an exchange column for the purposes described in which the stage comprises a planar array of mutually parallel transversely spaced tubes supplied at at least one end by a common manifold with the liquid, and respective upwardly open distributing channels overlying each of these tubes and communicating with the interior of the respective tube by respective openings spaced apart along the tops of said tubes.

Thus each horizontal tube lies beneath the respective channel and opens into it through openings formed on the upper side of the respective tube and hence in the bottom of the respective channel.

According to a feature of this invention, the tubes have rectangular cross sections, preferably square cross sections, so that their upper sides are planar walls provided with the aforementioned openings. The channels can be formed, in accordance with this concept by pairs of plates flanking the vertical wall of each tube, the plates being extended downwardly into tongues which are spaced apart along each tube and which serve to spread the liquid passing over the walls of the channel onto these tongues.

According to yet another feature of the invention, each of the channel walls above the bottom or floor of the channel, defined by the upper planar wall of the respective tube, is formed with slits through which the liquid can pass to flow downwardly onto the aforementioned tongues.

The uniformity of flow of the liquid downwardly from the respective channel is guaranteed by providing capillary action means to effectively pump the liquid from the channel downwardly.

Such capillary means can include J-shaped inverted rods reaching into the respective slots and having short ends extending downwardly into the liquid within the respective channel and closely hugging the wall thereof so that capillary crevices are provided between these rods and the channel walls. The long shanks of the rods can lie along the outer surface of the walls and can each be aligned with a respective one of the aforementioned tongues.

The inner shanks or legs of the rods advantageously are of various lengths so that, for example, most of the rods will be effective with low liquid levels in the channel to capillarily promote the withdrawal of the liquid therefrom, while other rods will become effective as the liquid level rises to increase the total number of rods promoting capillary flow.

BRIEF DESCRIPTION OF THE DRAWING

The above and other objects, features and advantages of the present invention will become more readily apparent from the following description, reference being made to the accompanying drawing in which:

FIG. 4 is a section along the line IV—IV of FIG. 3;

FIG. 4A is a diagram showing the layout of the tongues of FIG. 4;

FIG. 4B is a section taken along the line IVB—IVB of FIG. 4; and

FIG. 5 is a side view of a portion of the structure shown in FIG. 4.

SPECIFIC DESCRIPTION

Figure 1:
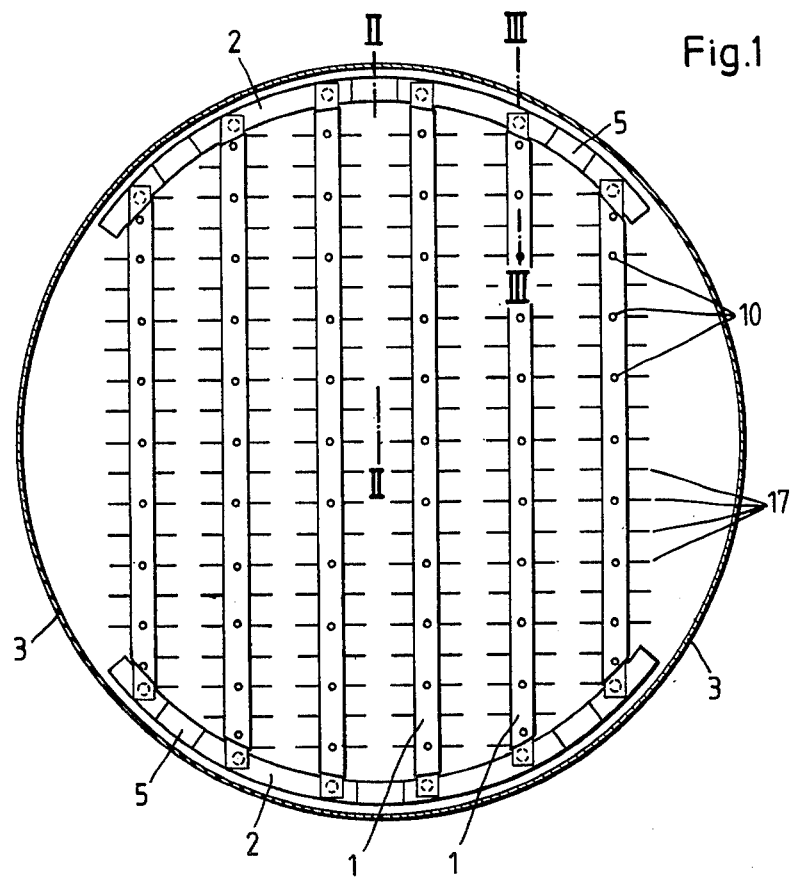
FIG. 1 is a plan view of a distributor stage in accordance with the invention as seen from above and drawn somewhat diagrammatically, this view corresponding to a horizontal section through the column.
Figure 2:
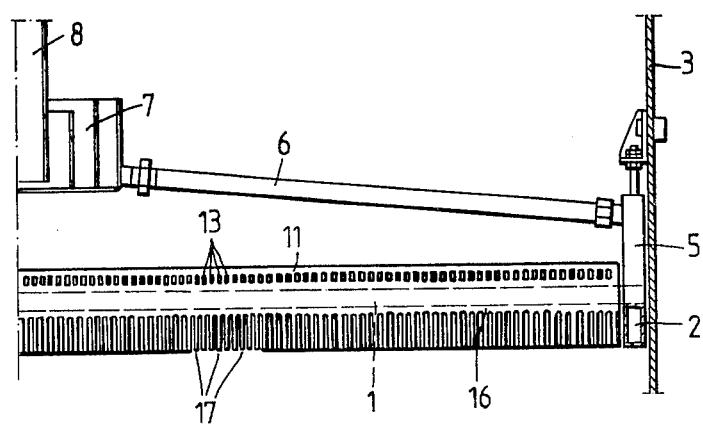
FIG. 2 is an enlarged detail view seen in section along the line II—II of FIG. 2 with part broken away or removed.

The distributor stage shown in the drawing is one of a number of such stages disposed in vertically spaced relationship, interspersed with a collecting system in which the liquid from an upper stage is collected from the channel to a feeder and then supplied to the lower stage as will be described in greater detail herein. The distributor stage can also be used as the initial liquid distributor over a column which is provided with a packing or wherever a distributor for liquid over the cross section of a column is required which has low resistance to the flow of vapor or gas therepast.

In the system of the drawing, the distributor stage comprises a plurality of mutually parallel horizontally oriented, coplanar, transversely spaced distributing tubes 1 which are closed at their opposite ends but communicate adjacent to each of these opposite ends with a respective manifold tube 2 via a bore b. The tubes, which lie along the inner wall of the column 3 at diametrically opposite locations, have circular arc configurations concentric to the column walls.

Figure 3:
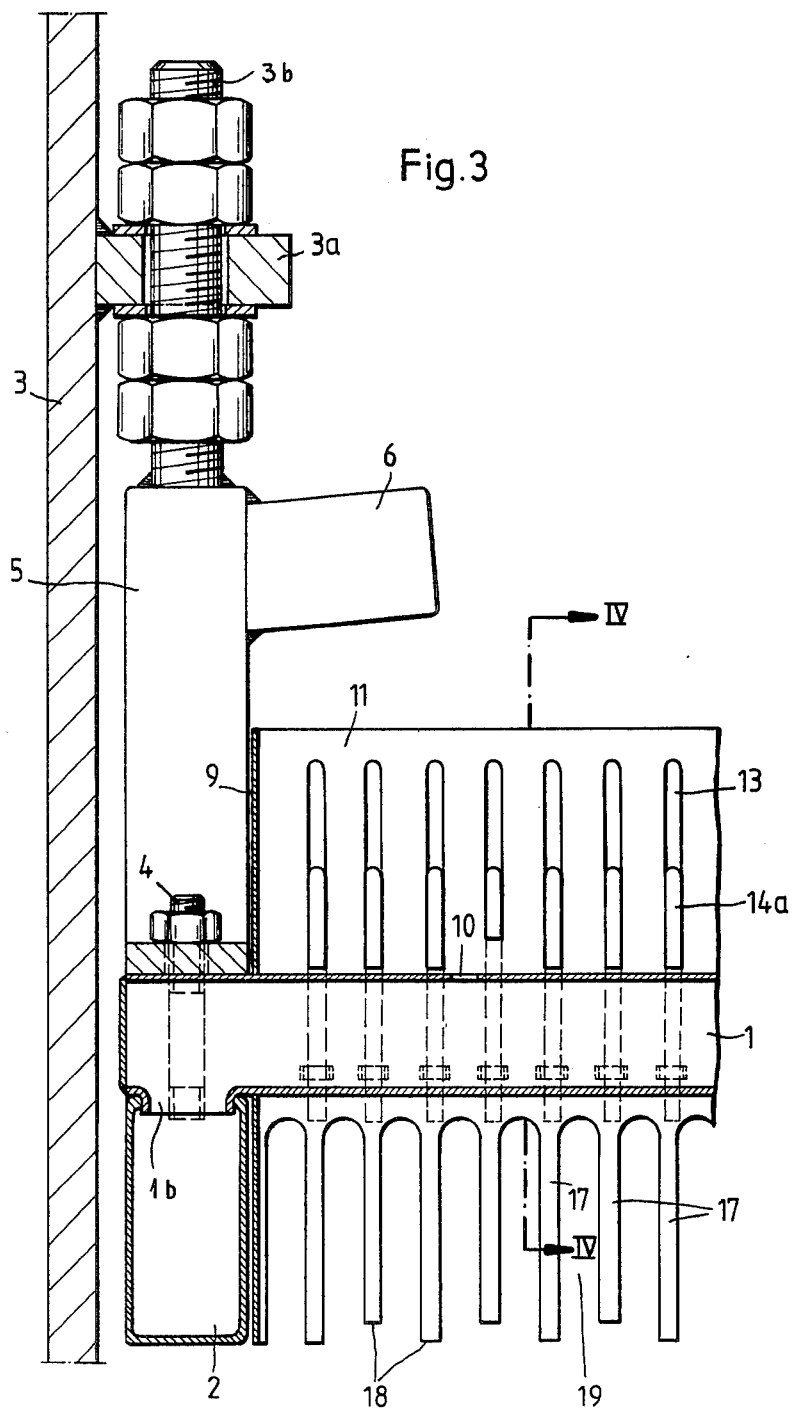
FIG. 3 is a further detail view and still larger scale representing a section along the line III—III of FIG. 1.

The distributor tubes 1 have their opposite ends connected to the manifold tubes 2 by bolts 4 which also serve to mound the distributor via vertical feeder pipes 5 and bolts 3b on bracket 3a extending inwardly from the wall 3 (see FIG. 3).

Thus each of the manifold tubes 2 is provided with a number of the feed pipes 5 which are spaced along the manifold tubes 2 and are each connected to a respective generally radial supply pipe 6 fed from a central chamber 7 to which the liquid is delivered by a central duct 8.

As is especially clear from FIG. 4, the distributor pipes 1 each have a rectangular cross section with upper walls and centrally provided with a row of bores 10 spaced apart along the length of the pipe.

Above each bore 10, an inpingement or baffle plate 20 may be provided to deflect the outflowing stream of liquid laterally. The baffle plates 20 have not been illustrated and thus are not visible in FIGS. 1 and 3, where the bores 10 are seen to open directly into the respective channels or troughs.

Vertical plates 111 flank the vertical walls of the tubes 1 and define, with the wall 1a of each tube 1, a respective upwardly open channel or trough 12 lying along the top of the respective tube 1 and communicating with the latter via the bores 10.

At their ends, each channel is closed by a pair of plates one of which is seen at 9 in FIG. 3.

Each of the walls 11 of each channel 12 above the wall 1a of the respective tube 1, is formed with a multiplicity of uniformly spaced vertical slits or slots 13.

Each of these slots 13 receive an inverted J-shaped rod 14 of cross section (see FIG. 4B) whose inner shank 14a lies against the inner surface of the respective wall 11 while the outer shank 14b, significantly longer than the inner shank, lies along the outer surface of this wall 11 and extends downwardly below the channel and the tube (see FIGS. 4–5).

Consequently, between each wall 11 and the shanks 14a, 14b, capillary crevices 14a' and 14b' are formed which uniformly carry the liquid over the lower edge of the respective slot and permit the liquid to flow downwardly along the exterior of the trough and pipe.

The elements 14 are held against the wall 11 by eyes 15 which can be stamped from the plates forming the walls 11. The length of the inner shanks 14a of the capillary elements 14 varies. A portion of these inner shanks reaches substantially down to the upper surface 1a of the respective distributing tube 1 while other shanks 14a are spaced by a comparatively large distance above this upper wall. This distance can range from several millimeters to several centimeters. When, for example, the ends of the shorter shanks 14a are spaced by a distance of, say, 100 mm from the top of the respective distributing tube and the ends of the other shanks 14a have a distance of substantially 2 mm therefrom, liquid is drawn by the capillaries to the tongue 17 only by the last mentioned capillary elements 14 until the liquid level rises to about 10 mm or as long as the liquid level is less than 10 mm in the troughs.

When the liquid in the troughs 12 does not reach to the lower ends of the shorter inner shanks 14a, the liquid is only drawn capillarily by the longer shanks and rods 14 from the trough. As the liquid level rises, it may reach additional inner shanks, thereby increasing the number of capillary channels which pump the liquid out of the trough.

The walls 11 are extended downwardly, the extension being represented at 16, below the tubes 1 and are formed with multiplicities of tongues 17 which are alternately coplanar with the walls 11 or bent out of the plane of the walls 11 as shown in FIGS. 4, 4a and 5.

Each second tongue is thus bent out of the plane so that the tongues have the same distance (a) from one another. By a corresponding dimensioning of the slits 13, the liquid can be highly uniformly distributed over the cross section of the column.

I claim:

1. A distributor stage for an exchange column comprising:
   a plurality of mutually parallel transversely spaced horizontal distributor tubes of rectangular cross section having a planar horizontal top wall provided with a plurality of mutually spaced openings distributed therealong, a horizontal bottom and planar vertical lateral walls;
   manifold means for feeding liquid into said tubes at least at one of the ends thereof; and
   a pair of vertical plates flanking each tube and lying along the respective lateral walls while exending above said top wall to form a respective upwardly open trough above each of said tubes and communicating with said openings whereby liquid is fed upwardly through such openings from each tube into the respective trough for distribution in said column, said plates also extending downwardly below the bottom of each tube to form liquid-spreading extensions therebelow.

2. The distributor stage defined in claim 1 wherein each of said extensions is slitted to form respective tongues.

3. The distributor stage defined in claim 2 wherein alternate tongues are bent out of the planes of said plates so that the spacings of free ends of said tongues from their nearest neighbors are constant.

4. The distributor stage as defined in claim 1 wherein said plates are formed above the top wall of the respective tube with spaced apart vertical slits, further comprising capillary means for drawing liquid from each trough through the respective slits.

5. The distributor stage defined in claim 4 wherein said capillary means includes an inverted J-shaped rod received in each of said slits and having a relatively short shank lying along an inner surface of the respective plate extending into the respective trough and a relatively long shank lying along an outer surface of the respective plate.

6. The distributor stage defined in claim 5 wherein said short shanks are of different lengths.

7. The distributor stage as defined in claim 5 wherein each of said plates is formed with a multiplicity of tongues extending downwardly below the respective tube, each of said long shanks being disposed directly over a respective one of said tongues.

8. The distributor stage defined in claim 7 wherein every second tongue is bent out of the plane of the remaining tongues.

9. The distributor stage as defined in claim 8, further comprising a baffle plate spaced above each of said openings.

10. The distributor stage as defined in claim 5, further comprising a baffle plate spaced above each of said openings.

11. The distributor stage as defined in claim 1, further comprising a baffle plate spaced above each of said openings.

* * * * *